United States Patent
Schwark

(10) Patent No.: US 9,783,148 B2
(45) Date of Patent: Oct. 10, 2017

(54) AIR BAG COVER WITH INTEGRATED STEERING PANEL

(71) Applicant: TRW Vehicle Safety Systems Inc., Washington, MI (US)

(72) Inventor: Diane M. Schwark, Lenox, MI (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 1 day.

(21) Appl. No.: 15/098,369

(22) Filed: Apr. 14, 2016

(65) Prior Publication Data
US 2016/0332591 A1    Nov. 17, 2016

Related U.S. Application Data

(60) Provisional application No. 62/161,529, filed on May 14, 2015.

(51) Int. Cl.
*B60R 21/201* (2011.01)
*B60R 21/206* (2011.01)
*B60R 21/2165* (2011.01)
*B60R 21/00* (2006.01)
*B60R 21/16* (2006.01)

(52) U.S. Cl.
CPC ......... *B60R 21/206* (2013.01); *B60R 21/201* (2013.01); *B60R 21/2165* (2013.01); *B60R 2021/0051* (2013.01); *B60R 2021/161* (2013.01)

(58) Field of Classification Search
CPC . B60R 21/201; B60R 21/206; B60R 21/2165; B60R 2021/0051; B60R 2021/161
See application file for complete search history.

(56) References Cited

U.S. PATENT DOCUMENTS

| 5,765,867 A * | 6/1998 | French | B60R 21/16 280/743.1 |
| 6,070,904 A * | 6/2000 | Ozaki | B60R 21/16 280/728.1 |
| 6,145,879 A * | 11/2000 | Lowe | B60R 21/20 280/743.1 |
| 7,314,228 B2 * | 1/2008 | Ishiguro | B60R 21/201 280/728.1 |

(Continued)

FOREIGN PATENT DOCUMENTS

DE    102011011424 A1 *    8/2012    ........... B60R 21/201

*Primary Examiner* — Faye M Fleming
(74) *Attorney, Agent, or Firm* — Tarolli, Sundheim, Covell & Tummino LLP

(57) ABSTRACT

An air bag module includes an inflatable air bag, an inflator for inflating the air bag, a housing for supporting the air bag and inflator, and a cover for enclosing the air bag in the housing. The cover includes a fabric panel and a steering panel. The fabric panel has a main portion that at least partially envelops the air bag in a deflated and stowed condition and includes a tear seam that is rupturable upon inflation of the air bag to permit the air to deploy from the housing. The steering panel is for directing the air bag to deploy from the housing along a predetermined trajectory. The steering panel includes a panel of reinforcing material that overlies a portion of the fabric panel and is connected to the fabric panel. In a closed condition of the cover, the steering panel is fastened to the housing.

28 Claims, 13 Drawing Sheets

(56) References Cited

U.S. PATENT DOCUMENTS

| | | | | |
|---|---|---|---|---|
| 7,695,013 B2* | 4/2010 | Kakstis | ................... | B60R 21/20 280/743.1 |
| 7,946,620 B2* | 5/2011 | Vigeant | ................. | B60R 21/201 280/743.1 |
| 8,596,679 B2* | 12/2013 | Horikawa | ............. | B60R 21/201 280/732 |
| 2004/0066021 A1* | 4/2004 | Dumbrique | ........... | B60R 21/201 280/728.2 |
| 2007/0241541 A1* | 10/2007 | Miwa | ................... | B60R 21/201 280/728.2 |

* cited by examiner

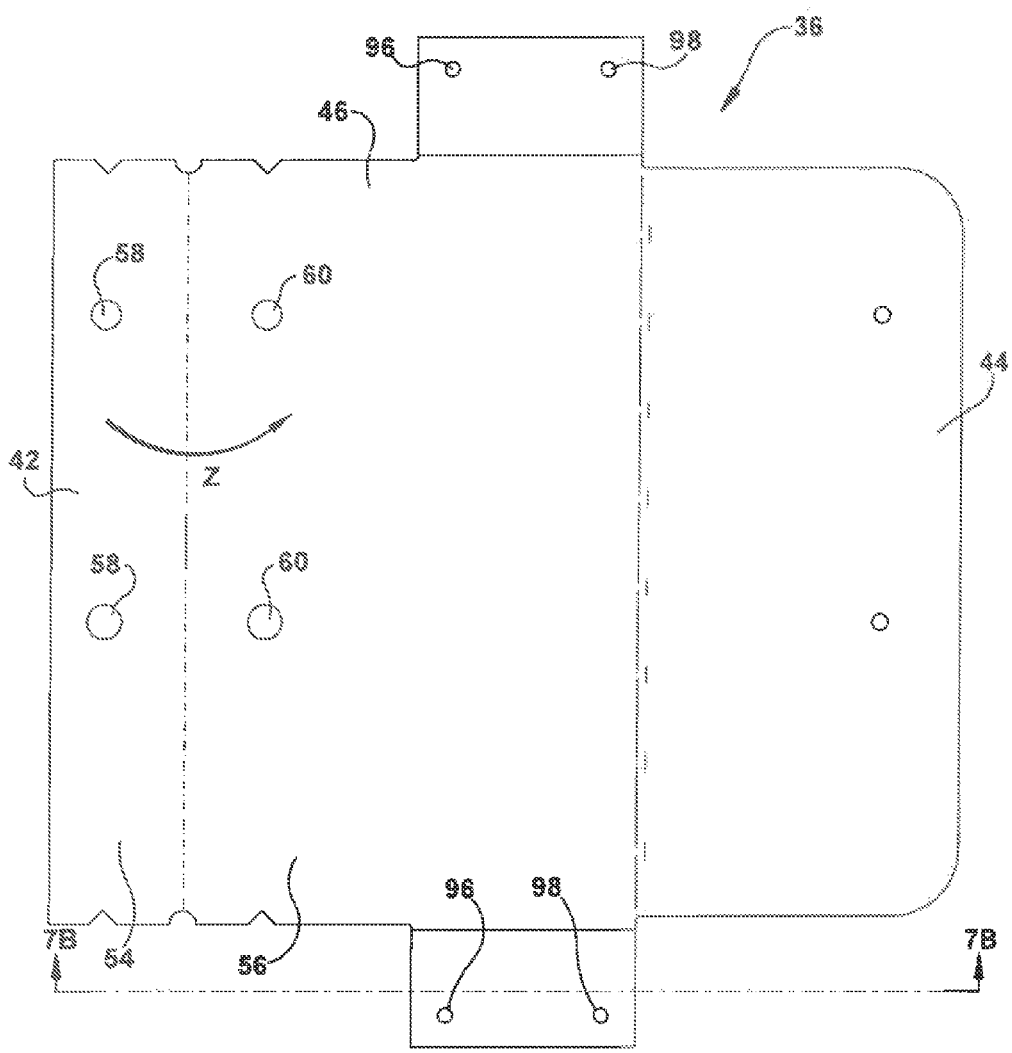
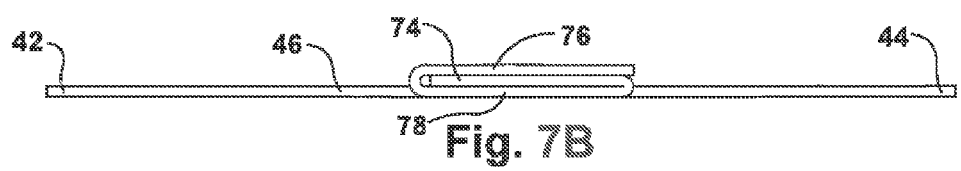

AIR BAG COVER WITH INTEGRATED STEERING PANEL

FIELD OF THE INVENTION

The present invention relates to safety restraint systems for a vehicle, and more particularly, to an air bag module having a cover with an integrated steering panel.

BACKGROUND OF THE INVENTION

It is known to deploy an inflatable vehicle occupant protection device, such as an air bag, upon the occurrence of an event for which occupant protection is desired, such as a vehicle collision or rollover. The air bag is part of a conventional vehicle occupant protection apparatus that includes a sensor and an inflation fluid source, such as an inflator. Upon sensing the occurrence of an event for which deployment of the air bag is desired, the inflation fluid source is actuated and produces inflation fluid that inflates the air bag, causing it to deploy into the vehicle occupant compartment to help protect the vehicle occupants.

One particular type of inflatable vehicle occupant protection device is a passenger frontal air bag. Passenger frontal air bags are typically stored in a deflated condition in a housing that is mounted behind a class A surface of the vehicle instrument panel. A cover, which can form a portion of the class A surface, is connectable with the housing and/or instrument panel to help enclose and conceal the air bag in a stored condition. Upon deployment of the passenger air bag, the forces exerted on the cover by the inflating air bag cause the cover to rupture or otherwise open, which permits the air bag to inflate and move to a deployed position.

Another type of inflatable vehicle occupant protection device is an inflatable knee air bag. Knee airbags are typically stored in a housing or canister that is mounted in the area of the lower portion of the instrument panel and the vehicle foot well. Knee air bags are inflatable to a deployed condition in which the air bag is positioned between the occupant's legs and the instrument panel to help protect the vehicle occupant.

SUMMARY

According to one aspect, an air bag module includes an inflatable air bag, an inflator for inflating the air bag, a housing for supporting the air bag and inflator, and a cover for enclosing the air bag in the housing. The cover includes a fabric panel and a steering panel. The fabric panel has a main portion that at least partially envelops the air bag in a deflated and stowed condition and includes a tear seam that is rupturable upon inflation of the air bag to permit the air to deploy from the housing. The steering panel is for directing the air bag to deploy from the housing along a predetermined trajectory. The steering panel includes a panel of reinforcing material that overlies a portion of the fabric panel and is connected to the fabric panel. In a closed condition of the cover, the steering panel is fastened to the housing.

According to another aspect, alone or in combination with any other aspect, overlying portions of both the main panel and the steering panel can be fastened to the housing.

According to another aspect, alone or in combination with any other aspect, the steering panel can form a cover for covering an open end of the housing.

According to another aspect, alone or in combination with any other aspect, the steering panel and the housing together can define an enclosure in which the air bag is stored in the deflated and stowed condition prior to deployment.

According to another aspect, alone or in combination with any other aspect, the steering panel can form a class-B surface in a vehicle.

According to another aspect, alone or in combination with any other aspect, the housing can be adapted to be positioned behind a class-A surface of an instrument panel and can have an open end from which the air bag deploys. The open end can be presented downward into a foot well of a vehicle, and the steering panel can cover the open end of the housing.

According to another aspect, alone or in combination with any other aspect, the air bag can be a knee air bag. The air bag and the steering panel can be adapted such that the predetermined trajectory is away from a foot well of a vehicle and along a surface of an instrument panel that is presented toward an occupant seat of the vehicle.

According to another aspect, alone or in combination with any other aspect, the steering panel can deflect the air bag to deploy from the housing while remaining connected to the housing.

According to another aspect, alone or in combination with any other aspect, the cover can be constructed of nylon and the steering panel can be constructed from a high density polyethylene material or multiple layers of fabric, such as nylon.

According to another aspect, alone or in combination with any other aspect, the fabric panel can include a main section and two wings sections on opposite lateral ends of the main section. The main section can include the tear seam. Each of the wings can include stacked layers of material on a surface of the panel opposite the surface to which the reinforcing panel is connected.

According to another aspect, alone or in combination with any other aspect, the air bag module can include apertures for receiving fasteners for mounting the air bag module in the vehicle. The apertures can extend through the wings and end portions of the reinforcing panel that overlie the wings.

According to another aspect, alone or in combination with any other aspect, the housing can be a rigid housing separate from the cover.

According to another aspect, alone or in combination with any other aspect, the housing can be a fabric structure formed with the same fabric material used to construct the cover.

According to another aspect, alone or in combination with any other aspect, the cover and the housing can be formed from a single piece of fabric including a cover portion and a housing portion. The cover portion can be folded and have portions interconnected to define the cover. The housing portion can be folded and have portions interconnected to define the housing.

According to another aspect, alone or in combination with any other aspect, the cover portion can include a main section and two wings on opposite lateral ends of the main section. Each of the wings can include layers of material that are folded over onto a surface of the panel opposite the surface to which the reinforcing panel is connected. The layers of the wings can be interconnected with each other.

According to another aspect, alone or in combination with any other aspect, the air bag module can include apertures for receiving fasteners for mounting the air bag module in the vehicle. The apertures can extend through the wings and end portions of the reinforcing panel that overlie the wings.

According to another aspect, alone or in combination with any other aspect, the air bag module can include reinforcing panels secured to opposite ends of the steering panel at locations corresponding to the wings, Each reinforcing panel can include apertures that correspond with the apertures in the steering panel and wings that they overlie. Each reinforcing panel is connected to the steering panel and wing by grommets that reinforce the overlying apertures.

According to another aspect, alone or in combination with any other aspect, the housing can include mounting tabs at opposite ends of the housing configured to abut the wings when the cover is in a closed condition. The mounting tabs can include apertures that correspond in number and position with the apertures of the wings. The housing can be maintained in a closed condition through the fastening together of the mounting tabs and wings by fasteners extend through those apertures and mount the air bag module in the vehicle.

According to another aspect, an air bag module can include a fabric panel including a cover portion and a housing portion. The housing portion can be folded and have portions interconnected to define a housing for receiving an air bag and inflator. The cover portion can be folded and have portions interconnected to define a cover for enclosing an air bag and inflator in the housing. The fabric panel can include a rupturable tear seam. The air bag module can also include a steering panel configured to direct an air bag to deploy from the housing along a predetermined trajectory. The steering panel can include a panel of reinforcing material that overlies and is connected to the cover. The housing, cover, and steering panel can have portions that overlie each other when the cover is in a closed condition. The housing, cover, and steering panel can include respective apertures that are aligned with each other when the cover is in the closed condition. The apertures can be configured to receive fasteners for connecting the housing, cover, and steering panel to the vehicle.

According to another aspect, alone or in combination with any other aspect, the cover can include a main section and two wings on opposite lateral ends of the main section. Each of the wings can include layers of material that are folded over onto a surface of the panel opposite the surface to which the reinforcing panel is connected. The layers of the wings can be interconnected with each other.

According to another aspect, alone or in combination with any other aspect, the fasteners for connecting the housing, cover, and steering panel to the vehicle can extend through the wings and end portions of the reinforcing panel that overlie the wings.

According to another aspect, alone or in combination with any other aspect, the air bag module can also include reinforcing panels secured to opposite ends of the steering panel at locations corresponding to the wings. Each reinforcing panel can includes apertures that correspond with the apertures in the steering panel and wings that they overlie. Each reinforcing panel can be connected to the steering panel and wing by grommets that reinforce the overlying apertures.

According to another aspect, alone or in combination with any other aspect, the housing can include mounting tabs at opposite ends of the housing configured to abut the wings when the cover is in a closed condition. Fasteners for connecting the housing, cover, and steering panel to the vehicle can extend through the mounting tabs.

According to another aspect, alone or in combination with any other aspect, the steering panel can form a class-B surface in a vehicle.

According to another aspect, alone or in combination with any other aspect, the housing can be adapted to be positioned behind a class-A surface of an instrument panel and have an open end from which the air bag deploys. The open end can be presented downward into a foot well of a vehicle, and the steering panel can cover the open end of the housing.

According to another aspect, alone or in combination with any other aspect, the air bag can be a knee air bag. The air bag and the steering panel can be adapted such that the predetermined trajectory is away from a foot well of a vehicle and along a surface of an instrument panel that is presented toward an occupant seat of the vehicle.

According to another aspect, alone or in combination with any other aspect, the steering panel can deflect the air bag to deploy from the housing while remaining connected to the housing.

According to another aspect, alone or in combination with any other aspect, the fabric panel can be constructed of nylon and the steering panel can be constructed from a high density polyethylene material or multiple layers of fabric, such as nylon.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which:

FIG. 7A is a plan view illustrating another step in the assembly of a portion of the apparatus according to the first example configuration.

FIG. 7B is a sectional view along line 7B-7B of FIG. 7A.

DETAILED DESCRIPTION

Figure 1:
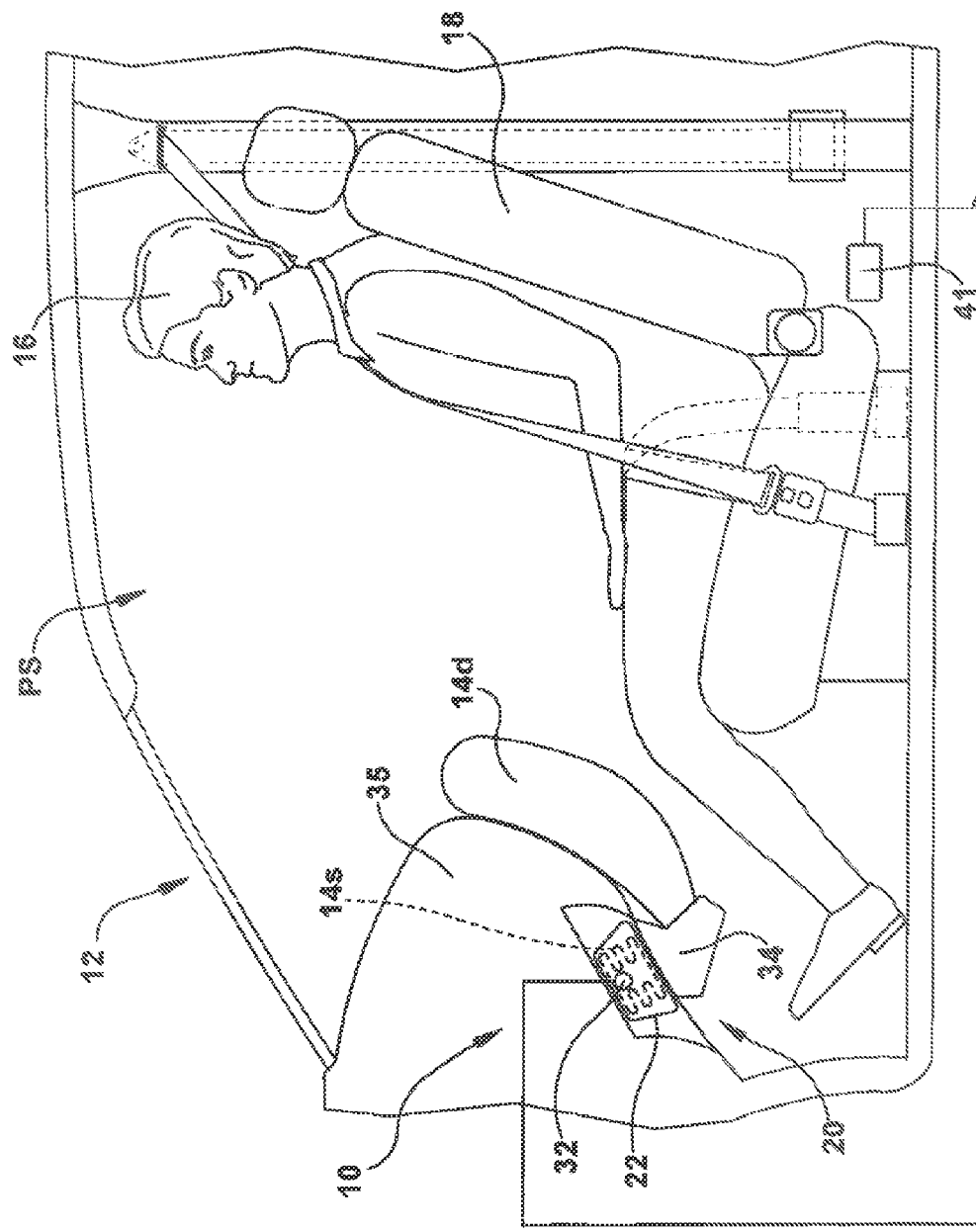
FIG. 1 is a side view that illustrates schematically an apparatus for helping to protect an occupant of a vehicle.

An apparatus 10 for helping to protect an occupant 16 of a vehicle 12 includes an inflatable vehicle occupant protection device 14 in the form of a knee air bag. In the embodiment illustrated in FIG. 1, the air bag 14 is a passenger knee air bag for helping to protect an occupant 16 of a seat 18 on a passenger side PS of the vehicle 12. Those skilled in the art will appreciate that the apparatus 10 disclosed herein could be adapted for a driver side vehicle occupant (not shown) or occupants of rearward rows of the vehicle 12, such as a $2^{nd}$ row, $3^{rd}$ row, etc., of the vehicle (not shown).

The air bag 14 may be part of an air bag module 20 that includes a housing 22 and an inflator 32. The air bag 14 has a stored condition, indicated by dashed lines in FIG. 1 at 14s, in which the air bag is folded and placed in the housing 22. The module 20 is mounted to a dash or instrument panel 35 of the vehicle 12. The housing 22 helps contain and support the air bag 14 and inflator 32 in the instrument panel 35.

The inflator 32 is actuatable to provide inflation fluid to an inflatable volume of the air bag 14 to deploy the air bag to the inflated condition, indicated by solid lines in FIG. 1 at 14d. The inflator 32 may be of any known type, such as stored gas, solid propellant, augmented, or hybrid. The apparatus 10 includes a sensor, illustrated schematically at 41, for sensing an event for which inflation of the air bag 14 is desired, such as a collision. The inflator 32 is operatively connected to the sensor 41 via lead wires 37.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag 14. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Figure 2:
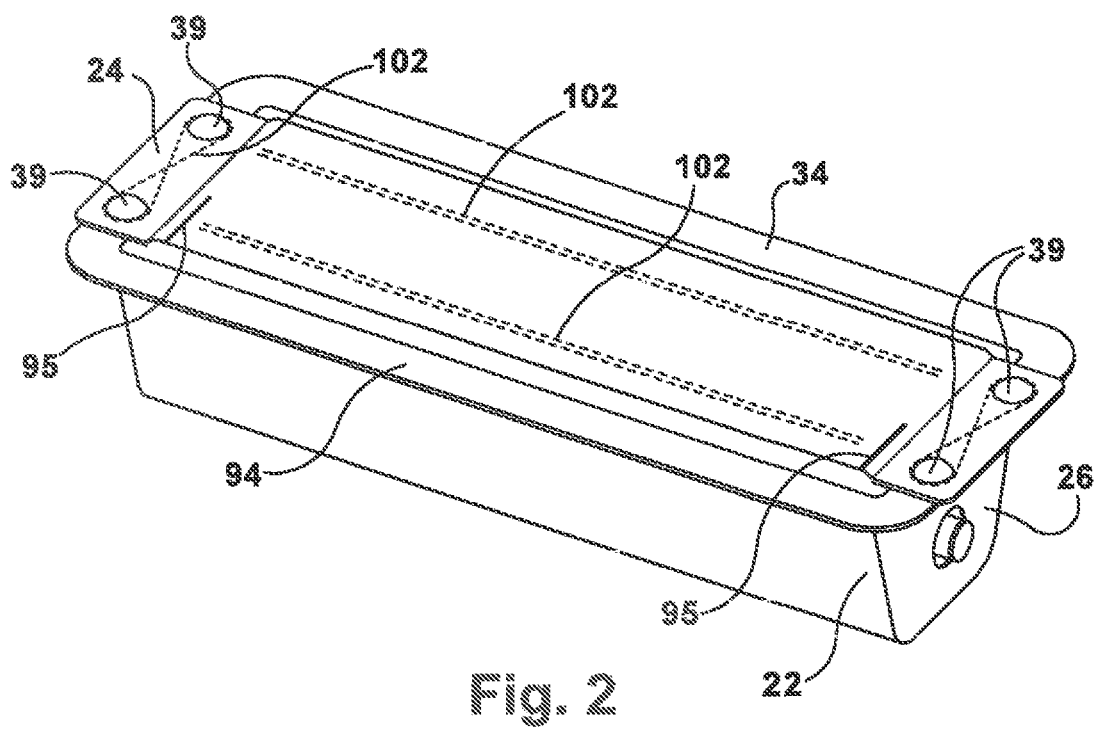
FIG. 2 is a perspective view depicting a portion of the apparatus illustrated in FIG. 1.
Figure 3:
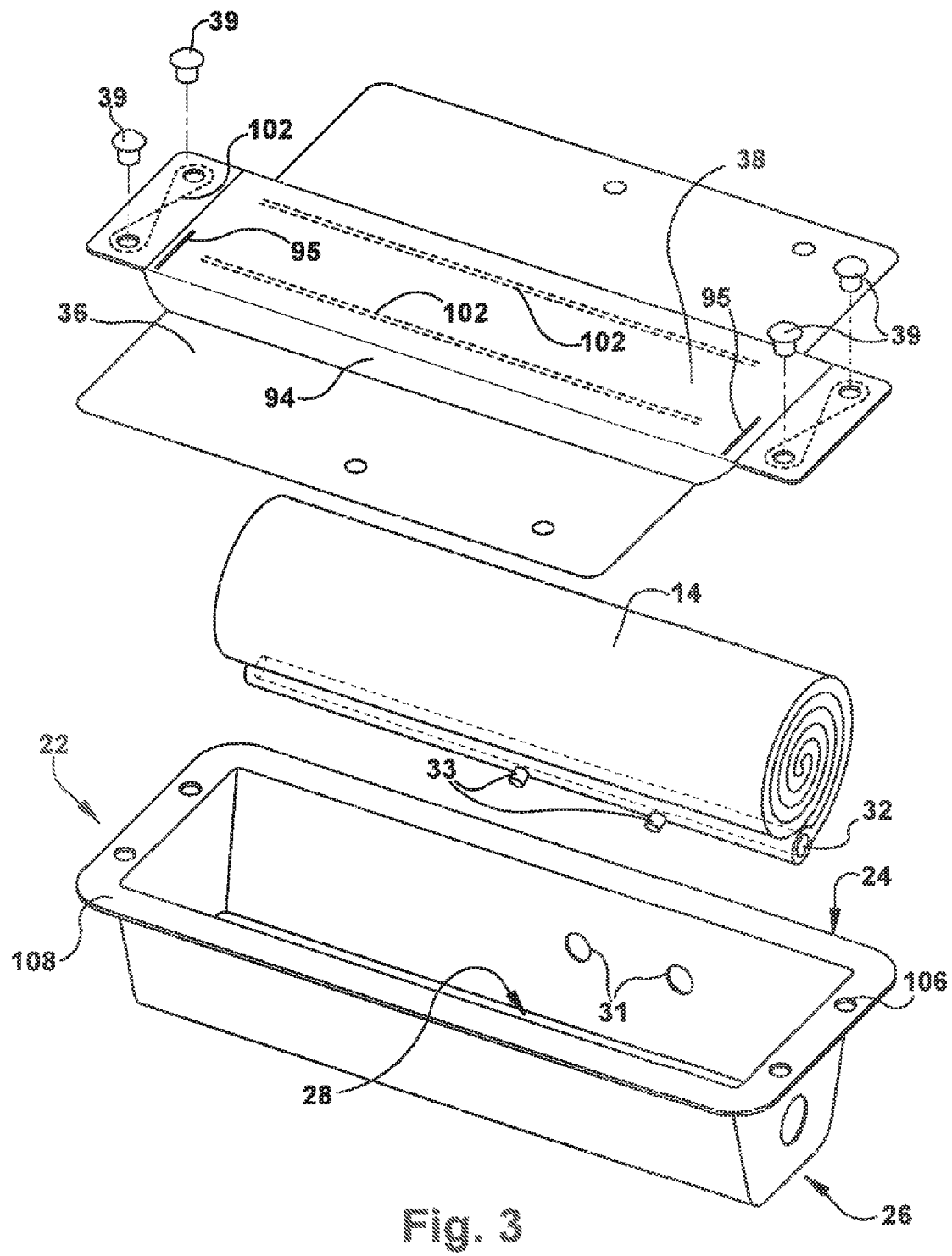
FIG. 3 is an exploded perspective view of the portion of the apparatus. of FIG. 2

The air bag module 20 is illustrated in FIGS. 2 and 3. The air bag module 20 includes a generally rectangular housing 22 having an open first end 24 and a closed second end 26. The first end 24 of the housing 22 has an annular rim 108 that defines an opening providing access to an interior space 28 of the housing. The second end 26 of the housing 22 defines a closed bottom wall of the housing. The air bag module 20 also includes the air bag 14 and the inflator 32. The housing 22 is configured to receive the air bag 14 and the inflator 32 in the interior space 28. The air bag module 20 further includes a cover 34 that includes a fabric panel 36 and a steering panel 38.

To assemble the air bag module 20, the inflator 32 is first secured to the air bag 14 by positioning the inflator inside the air bag while allowing inflator studs 33 to pass through the air bag fabric and extend outside the air bag. The air bag 14 is then folded, and the cover 34 is wrapped around and envelops the folded air bag. The inflator studs 33 are passed through corresponding openings in opposite ends of the cover 34 to connect the cover to the assemblage of the inflator 32 and the air bag 14. The assemblage of the air bag 14, inflator 32, and cover 34 is then positioned in the interior space 28 of the housing 22 such that the inflator studs 33 pass through corresponding openings 35 in the housing. Fasteners, such as threaded nuts, are installed on the studs to secure air bag 14, inflator 32, and cover 34 to the housing 22. The cover 34 itself is secured to the housing 22 individually, via fasteners, such as nuts and bolts.

Figure 4:
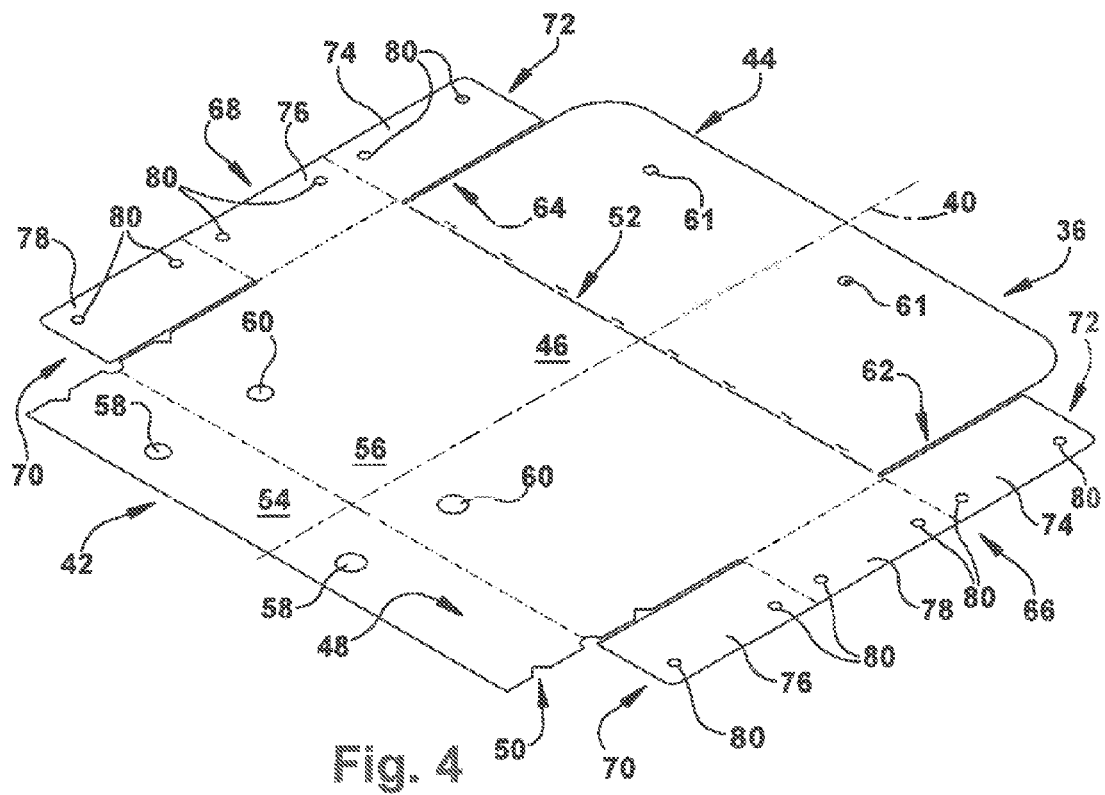
FIG. 4 is a perspective view of a first example configuration of a portion of the apparatus.
Figure 5:
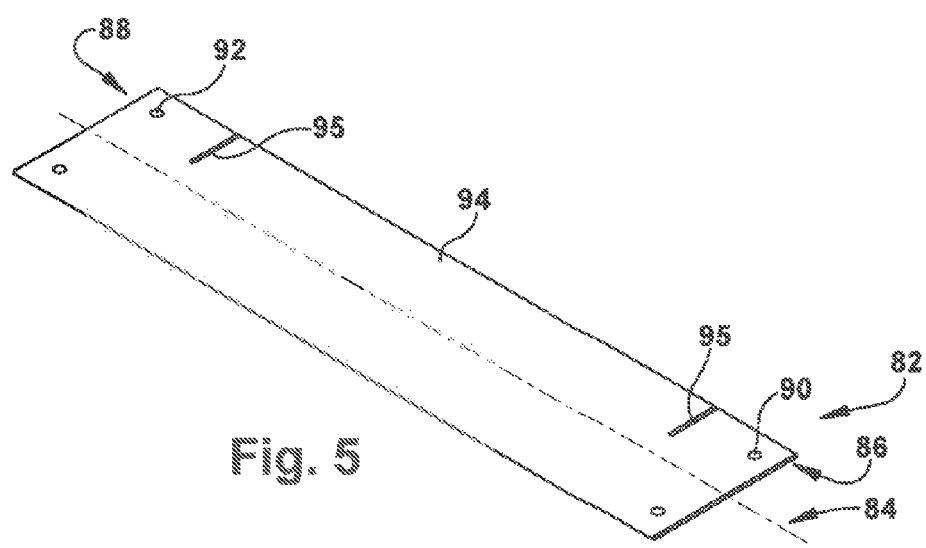
FIG. 5 is a perspective view of another portion of the apparatus.
Figure 6:
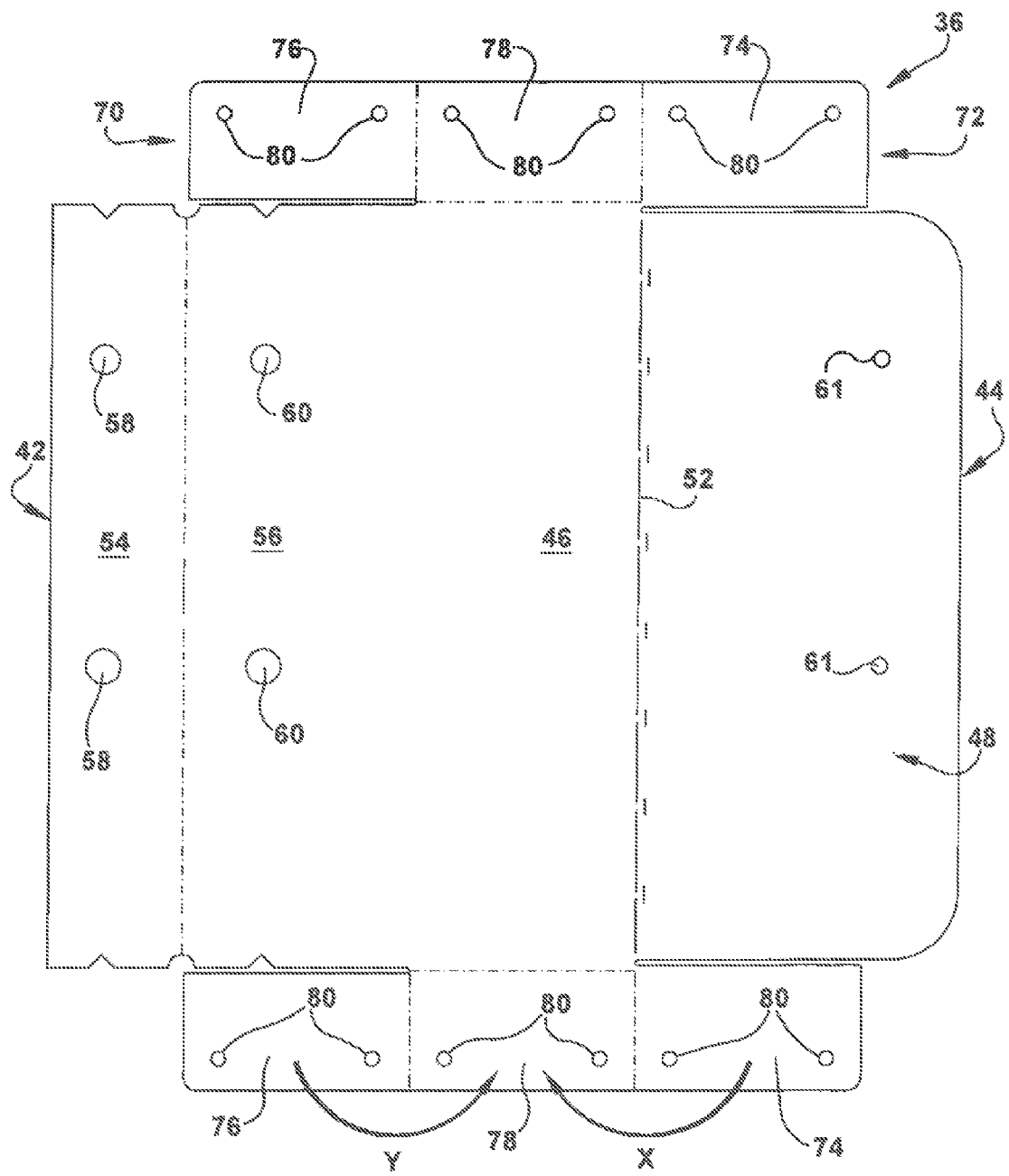
FIG. 6 is a plan view illustrating a step in the assembly of a portion of the apparatus according to the first example configuration.
Figure 12:
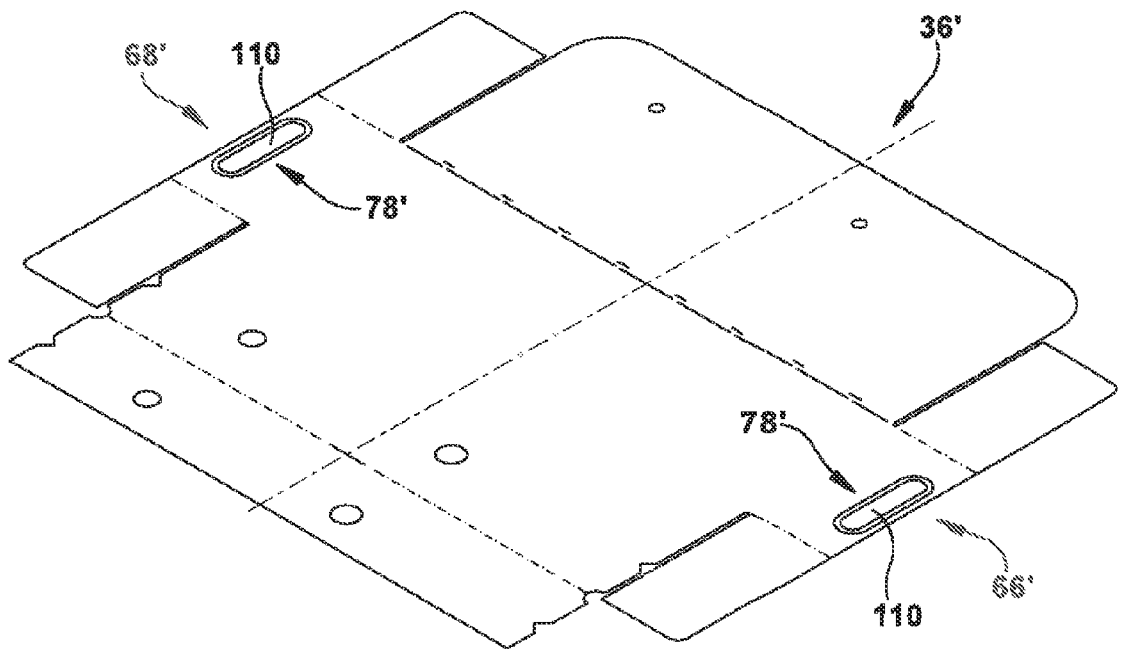
FIG. 12 is a perspective view of a second example configuration of a portion of the apparatus.
Figure 13:
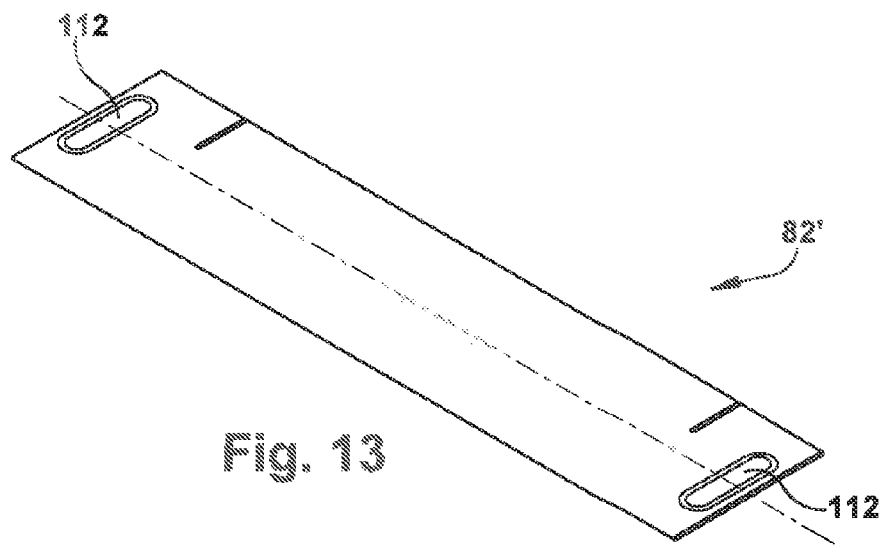
FIG. 13 is a perspective view of a second example configuration of another portion of the apparatus.

The cover 34 is constructed and arranged to both enclose the air bag 14 in the stored condition and to help direct or steer the air bag to deploy along a desired path or trajectory. The cover 34 can have a variety of configurations designed to achieve these purposes, two examples of which are illustrated in this description. In a first example configuration of the cover 34, the fabric panel 36 and the steering panel 38 can have a flanged design, which is best shown in FIGS. 4 and 5. In a second example configuration of the cover 34, the fabric panel 36 and the steering panel 38 can have a flanged design, which is best shown in FIGS. 12 and 13.

Referring to FIG. 4, according to the first example configuration of the cover 34, the flanged design of the fabric panel 36 is shown in an unassembled, lying flat condition. The fabric panel 36 can be constructed of any suitable material, such as nylon (e.g., woven nylon 6-6 yarns). The fabric panel 36 has a central longitudinal axis 40 that extends between a first end 42 and a second end 44 of the panel. The fabric panel 36 includes a substantially rectangular main portion 46 having a first face 48 and a second opposite face 50. A tear seam 52 is provided on the main portion 46. The tear seam 52 extends substantially perpendicular to the longitudinal axis 40 across the main portion 46. The tear seam 52 can, for example, comprise perforations in the material used to construct the panel 36 that weakens the panel along or in the area of the tear seam.

The main portion 46 includes a folding portion 54 and a receiving portion 56 at the first end 42 of the fabric panel 36. The folding portion 54 and the receiving portion 56 are shown as being separated by a dotted line in the figures for the sake of clarity. The folding portion 54 and the receiving portion 56 are respectively provided with a first aperture set 58 and a second aperture set 60. A third aperture set 61 is provided at the second end 42 of the fabric panel 36.

The main portion further 46 includes a first edge 62 and an oppositely disposed second edge 64. The first and second edges 62, 64 are respectively provided with first and second wings 66, 68. Each of the wings 66, 68 has a substantially rectangular shape and extends substantially parallel to the longitudinal axis 40 between a first end 70 and a second end 72. Each of the wings 66, 68 is divided into a first folding portion 74, a second folding portion 76, and a receiving portion 78. For the sake of clarity, the first folding portion 74, the second folding portion 76, and the receiving portion 78 are separated by dotted lines in the figures. A plurality of apertures 80 are provided on each of the wings 66, 68. The apertures 80 extend between the first end and second end 70, 72 of each of the wings 66, 68 and substantially parallel to the longitudinal axis 40. The apertures 80 are spaced along each of the wings 66, 67 such that first folding portion 74, the second folding portion 76, and the receiving portion 78 each include two apertures 80.

Referring to FIG. 5, according to the first example configuration of the cover 34, a steering panel 82 for use with the flanged design fabric panel 36 is shown in an unassembled condition. The steering panel 82 can be manufactured out of a die cut extruded plastic material (e.g., high density polyethylene). Alternatively, the steering panel 82 can be constructed of multiple layers of fabric material, such as nylon. In this fabric construction, fabric material used to construct the steering panel 82 can be constructed of fabric with high denier yarn weights in comparison to those used to construct the air bag 14 and/or the fabric panel 36. The steering panel 82 is substantially rectangular shaped and extends along a longitudinal axis 84 between a first end 86 and a second end 88. First and second aperture sets 90, 92 are respectively provided at the first and second ends 86, 88.

As shown in FIG. 5, the steering panel 82 can include a deployment flap 94 that extends across the steering panel 82 substantially parallel to the longitudinal axis 84. In this example configuration, the deployment flap 94 can be demarcated by a portion of the steering panel 82 that is weakened to form tear seams 95, which tend to rupture prior to other portions of the panel when exposed to the forces applied by the inflating and deploying air bag 14. The tear seams 95 can, for example, be formed by perforations in the steering panel 82 or by a line of reduced thickness, such as one or more grooves, in the panel.

The steering panel 82 can be configured without tear seams 95 defining the deployment flap 94. In this instance, the deployment flap 94 is formed by the entire leading edge of the steering panel 82, instead of a portion delineated by tear seams. Whether or not to include tear seams 95 can depend on a variety of factors, such as the force with which the air bag 14 is deployed and/or the thickness of the steering panel 82. Whether or not to include tear seams 95 can also depend the architecture of the air bag module 20 itself, for example, whether the housing 22 and/or steering panel 82 are configured to provide ample space for the air bag 14 to deploy without requiring movement of the steering panel to the extent where panel rupture is either likely to occur or necessary for air bag deployment.

Assembly of the cover 34 will now be described with reference to FIGS. 6-9. First, the first folding portion 74 of one of the first and second wings 66, 68 is folded toward the first end 70 of the wing 66, 68 as shown by arrow X such that the first folding portion 74 overlays the receiving portion 78 of the wing 66, 68. Then, the second folding portion 76 of the wing 66, 68 is folded toward the second end 72 of the wing 66, 68 as shown by arrow Y such that the second folding portion 76 overlays the first folding portion 74. This operation folds the wing 66, 68 to form three layers of material consisting of the receiving portion 78, the first folding portion 74, and the second folding portion 76 (FIG. 7). The layers are arranged such that the layers extend away from the first face 48 of the fabric panel 36. In this position, the apertures 80 of each layer are aligned so as to form a first passage set 96 and a second passage set 98. The above described sequence is then performed on the remaining wing 66, 68.

Figure 8A:
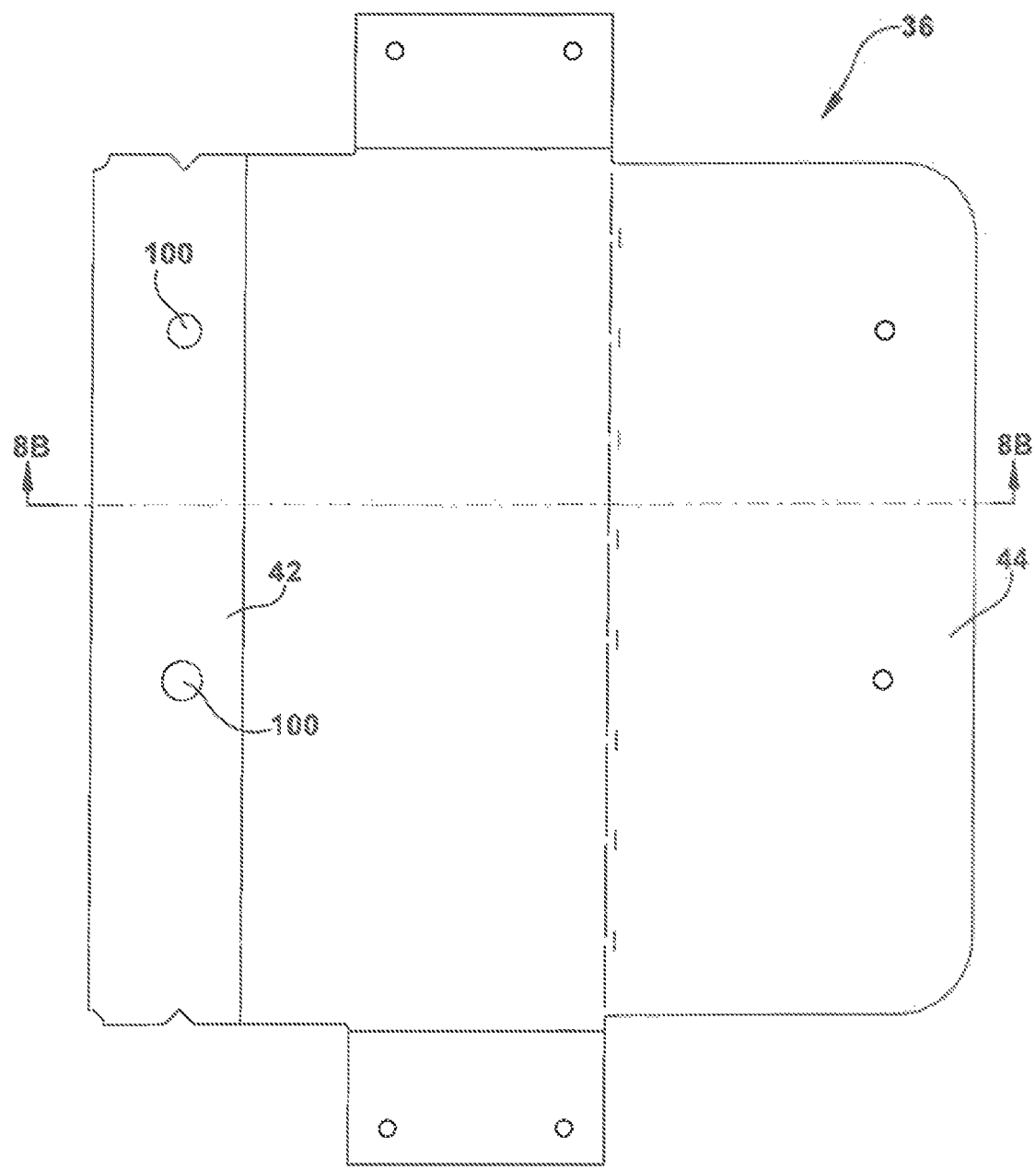
FIG. 8A is a plan view illustrating another step in the assembly of a portion of the apparatus according to the first example configuration.
Figure 8B:
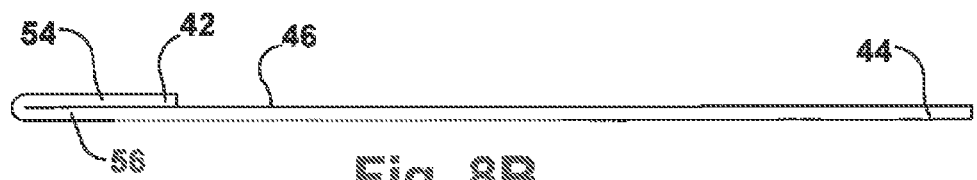
FIG. 8B is a sectional view along line 8B-8B of FIG. 8A.

Next, the folding portion 54 of the main portion 46 is folded toward the second end 44 of the fabric panel 36 as shown by arrow Z such that the folding portion 54 overlays the receiving portion 56 of the main portion 46. Again, the folded layers are arranged such that the layers extend away from the first face 48 of the fabric panel 36 (FIG. 8). In this position, the first aperture set 58 of the folding portion 54 is aligned with the second aperture set 60 of the receiving portion 56 to form a third passage set 100.

Figure 9A:
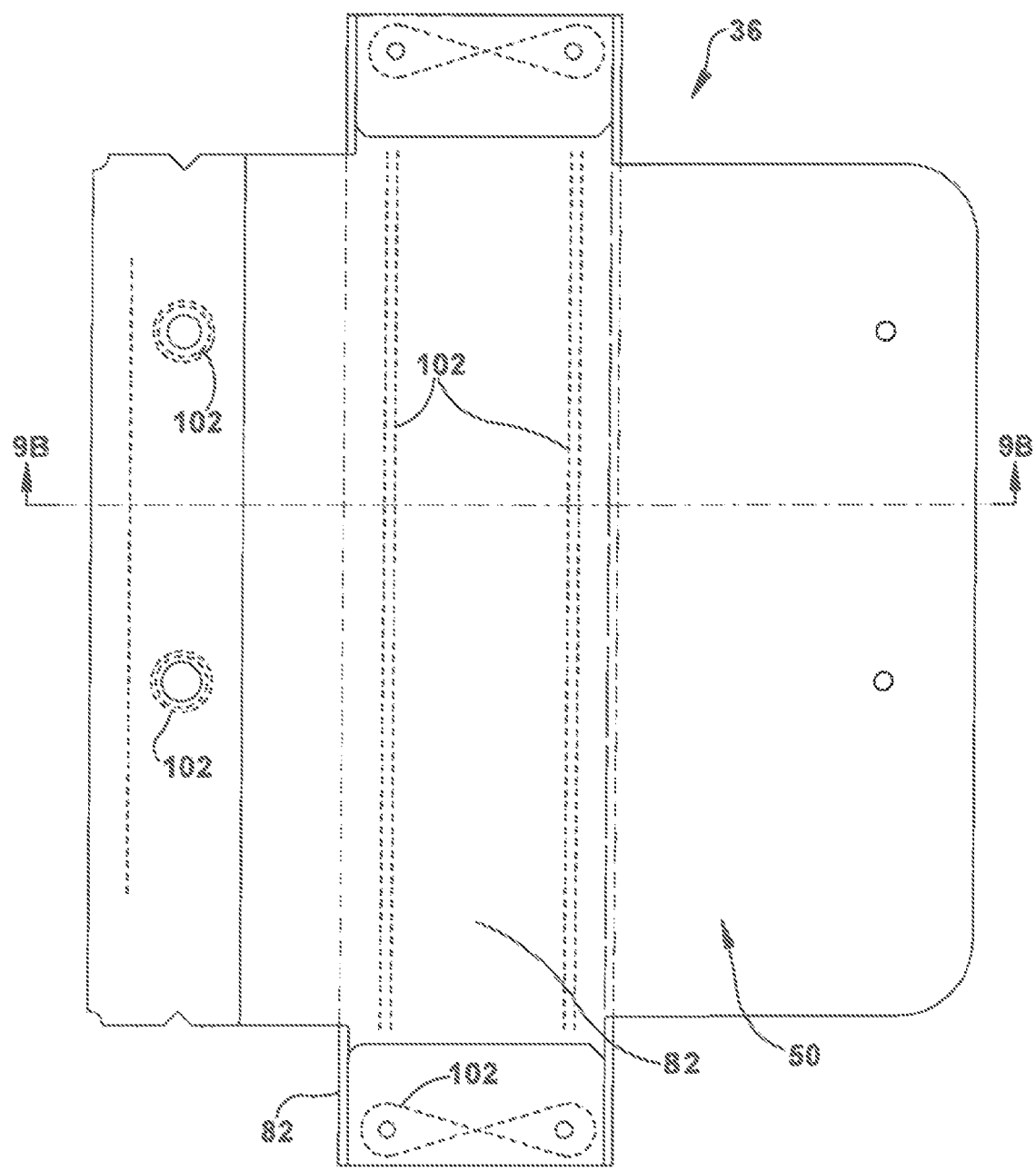
FIG. 9A is a plan view illustrating another step in the assembly of a portion of the apparatus according to the first example configuration.
Figure 9B:
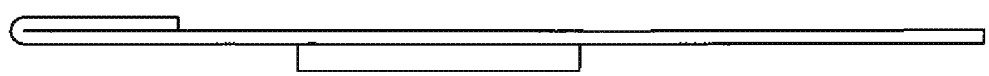
FIG. 9B is a sectional view along line 9B-9B of FIG. 9A.

Next, the steering panel 82 is positioned overlying the second face 50 of the fabric panel 36 (FIG. 9). The steering panel 82 is positioned overlying on the fabric panel 36 such that the longitudinal axis 84 of the steering panel 82 extends substantially perpendicular to the longitudinal axis 40 of the fabric panel 36. The steering panel 82 is positioned on the fabric panel 36 such that first aperture set 90 of the steering panel 82 is aligned with the first passage set 96 and the second aperture set 92 of the steering panel 82 is aligned with the second passage set 98. In this position, a leading edge of the steering panel 82, including the deployment flap 94, is aligned with the tear seam 52 of the fabric panel 36.

The cover 34 is assembled by securing the steering panel 82 to the fabric panel 36 via stitching 102. The stitching 102 extends in a figure eight pattern around the around first, second, and third passage sets 96, 98, 100 so as to secure the folded layers of material to each other and to the steering panel 82. The stitching 102 also extends along the longitudinal edges of the steering panel 82 to further secure the steering panel to the fabric panel 36. Those skilled in the art will appreciate that illustrated pattern of the stitching 102 is by way of example and that the stitching could extend in different patterns to interconnect portions of the fabric panel 36 and steering panel 82 to each other without materially affecting the performance of the cover 34.

The assembled cover 34 can then be secured to the air bag 14 and the inflator 32. The inflator 32 is positioned inside the air bag 14 in a known manner and oriented such that the inflator studs 33 extend through the air bag fabric and extend outside the air bag. The air bag 14 is then folded, rolled, or otherwise placed in a condition for being packaged in the cover 34. The cover 34 is then wrapped around the inflator 32 and air bag 14 so as to envelop and package the air bag therein. The third passage set 100 and the third aperture set 61 are installed over the inflator studs 33.

The assemblage of the air bag 14 and inflator 32, packaged in the cover 34, is then positioned in the interior space 28 of the housing 22 so that the inflator studs 33 pass through corresponding apertures in the second end 26 of the housing. Fasteners, such as threaded nuts, can then be installed on the studs 33 to secure the inflator 32, air bag 14, and cover 34 to the hosing housing 22.

Finally, the cover 34 is secured to the housing 22 by fasteners 104 (see FIGS. 2 and 3). The fasteners 104 extend through the first aperture set 90 and the first passage set 96 on one side of the cover 34 and the second aperture set 92 and the second passage set 98 on the opposite side of the cover 34. The fasteners 104 are received by receiving apertures 106 provided on the rim 108 of the housing 22 (FIG. 3). The fasteners 104 connect opposite end portions of the folded fabric layers of the fabric panel 36 directly to the housing 22 and also connect the opposite ends of the steering panel 82 directly to the rim 108. These connections secure the cover 34 directly to the housing 22.

Figure 10:
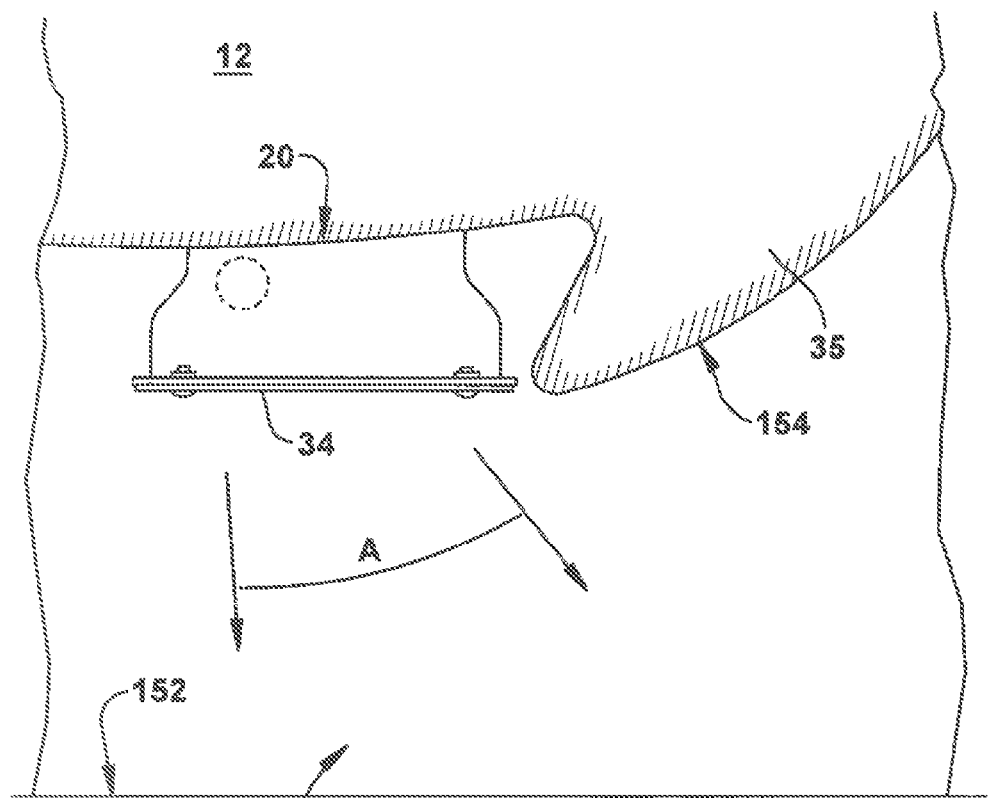
FIG. 10 is a side view illustrating the apparatus installed in a vehicle and in a non-actuated condition.

Referring to the more detailed views of FIGS. 10. and 11, the air bag module 20 is shown in its installed condition in the instrument panel 35 on the passenger side PS of the vehicle 12. The air bag module 20 is mounted such that the open end of the housing 22 is oriented facing into a foot well 150 of the vehicle 12 toward a vehicle floorboard 152. When the air bag module 20 is mounted in this location, it is appropriate for the steering panel 38 to have a finish (e.g., grained, black, unpainted) that qualifies it as a class B vehicle surface (i.e., exposed but hidden from view during normal vehicle operation). The steering panel 38 could have a different type of finish depending on where the air bag module 20 is mounted.

The air bag module 20 is activated upon the occurrence of an event for which deployment of the air bag 14 is desired, such as a vehicle collision or rollover. When the sensor 41 detects the occurrence of an event for which deployment of the air bag 14 is desired, the sensor 41 provides a signal to the inflator 32 via the lead wires 37. The inflator 32 is actuated and produces inflation fluid in a known manner, which is directed into the air bag 14, causing it to inflate and deploy air bag 14. The inflating air bag 14 deploys against the cover 34, causing the tear seam 52 and deployment flap 94 to rupture, thus permitting the air bag 14 to deploy from the housing 22.

It is desirable for the air bag 14 to deploy along an occupant facing surface 154 of the instrument panel 31 to a desired position between the instrument panel and the occupant, particularly the lower extremities of the occupant, e.g., the legs and feet. Due to factors that can vary widely from vehicle to vehicle, passenger to passenger, and event to event, deployment of the air bag 14 to the desired position needs to occur rapidly, such as within 15-20 milliseconds, in order for the air bag performance to be optimal. The inflator 32 can be engineered to provide inflation fluid at an ample volumetric flow rate to deploy the air bag 14 within this deployment window.

Because, however, the air bag module 20 is positioned behind the instrument panel 35 above the foot well 150 facing the floorboard 152, directing the air bag 14 to deploy along the desired trajectory along the surface 154 of the instrument panel 35 can be a challenge. The air bag 14 can be configured to follow the contour of the surface 154, for example, by configuring the air bag with structural features, such as shaping pleats, that cause the air bag to have a curved shape commensurate with the contour of the surface 154. When inflated, the air bag 14 will thus, on its own, follow the contour of the surface 154 of the instrument panel 35. Unfortunately, testing has shown that the air bag 14, left un-aided, can take an unacceptably long amount of time to reach this position, such as 30 milliseconds or longer. This is because, left to deploy under its own shaping characteristics, the air bag 14 can have a tendency to deploy in a range of directions indicated by A in FIG. 10 toward the floorboard 152 during the first 5-10 milliseconds of deployment, only thereafter moving into position along the surface 154. Therefore, this initial movement is, of course, undesirable.

According to the invention, the cover 34, however, is constructed, configured, and arranged to cooperate with the air bag 14 to help direct or steer the air bag against this tendency such that the air bag 14 deploys initially along the occupant facing surface 154 of the instrument panel 35 along the trajectory indicated generally by arrow B. Directing/steering the air bag 14 along the trajectory of arrow B during the initial stages of deployment causes the air bag 14 to reach the desired position between the occupant and the instrument panel 35 well within the required deployment time, e.g. 15-20 milliseconds or less.

Upon inflation, the air bag 14 exerts force on the cover 34, i.e., on both the fabric panel 36 and the steering panel 82. The inflation force exerted on the fabric panel causes the tear seam 52 to rupture, which releases the air bag 14 from the enveloping confines of the cover 34. The connections of the cover 34, i.e., both the fabric panel 36 and the steering panel 82, to the housing 22, however, are maintained throughout air bag deployment. The cover 34, i.e., both the fabric panel 36 and the steering panel 82 in combination, acts as a reaction surface against which the inflating air bag 14 deploys.

The forces exerted on the cover 34 by the deploying air bag 14 are well sufficient to permit the air bag to exit the housing 22 and reach the desired deployed position within the desired amount of time. In doing so, however, the resistance to deployment imparted on the air bag 14 by the cover 34 causes a reaction in the air bag in which its deployment direction is altered, steering the air bag to follow the deployment trajectory of arrow B. In the case of a cover 34 in which the steering panel 82 includes tear seams 95, the steering panel can rupture to permit movement of the deployment flap 94, creating a clearance between the cover and the housing 22 through which the air bag can deploy along this desired trajectory. In the case of a cover in which the steering panel 82 is free from tear seams, the deployment clearance can be created through deflection of the cover 34/steering panel 82, through the configuration of the housing 22, or through a combination of these features.

Advantageously, the cover 34 provides various functions with an efficiency of parts, materials, and manufacturing steps. The steering panel 82, forming the class B surface packaging the air bag module 20 in the vehicle 12, meets the protective and aesthetic requirements of a conventional module cover. Stitching the steering panel 82 to the fabric panel 36 and then fastening both to the housing 22 via fasteners provides the reaction surface that is sufficiently strong to withstand deployment forces and to provide the steering performance. Additionally, the use of the steering panel 82 in this manner adds to or enhances the performance folded fabric panel 36 portion of the cover 34, which can reduce the required number of layers in the panel and the amount of fabric material used to construct the panel. This can reduce the overall weight of the air bag module 20. Stitching the steering panel 82 to the fabric panel 36 can maintain the relative positions of those structures, which facilitates ease in assembly and also helps prevent any shifting or misalignment of those structures that could compromise performance of the cover 34 during air bag deployment.

FIGS. 12 and 13 illustrate a second example embodiment of a Referring to FIG. 12, a second example embodiment of the fabric panel 36' is shown in an unassembled condition. The second example embodiment of the fabric panel 36' is substantially similar to the first example embodiment of the fabric panel 36, and only differences between the two will be discussed. Similar features will be denoted with the same numerical identifier with the addition of a prime (') marker. Unlike the first example embodiment of the fabric panel 36 shown in FIG. 4, the wings 66', 68' of the fabric panel 36' in FIG. 12 do not include a plurality of apertures. Rather, in the second example embodiment of the fabric panel 36 shown in FIG. 12, the receiving portion 78 of each of the wings 66, 68 is provided with a single elongated fastener receiving aperture 110.

Referring to FIG. 13, a second example embodiment of a steering panel 82' for use with the second example embodiment of the fabric panel 36' is shown. The aperture sets of the first example embodiment of the steering panel 82 shown in FIG. 5 are omitted in the second example embodiment of the steering panel 82' and replaced with single elongated fastener receiving apertures 112 that coincide with the fastener receiving apertures 110 of the wings 66'. The fabric panel 36' and steering panel 82' are assembled in a manner similar or identical to that described above with regard to the first example embodiment.

A third example embodiment is illustrated in FIGS. 14-17. The third example embodiment is similar to the first and second example embodiments. In the third example embodiment, the air bag cover of the apparatus is formed, at least in part, as a portion of a fabric panel that also has portions which define a fabric air bag housing. The embodiment of FIGS. 14-17 is thus a housing and cover combination that omits the need for a rigid air bag housing, such as the housing 22 of the first example embodiment of FIGS. 2 and 3. Although the cover portion 250 of the third example embodiment has a configuration similar to that of the first example embodiment, it should be understood that the cover can be similar or identical to either the first or second example embodiments.

Figure 14:
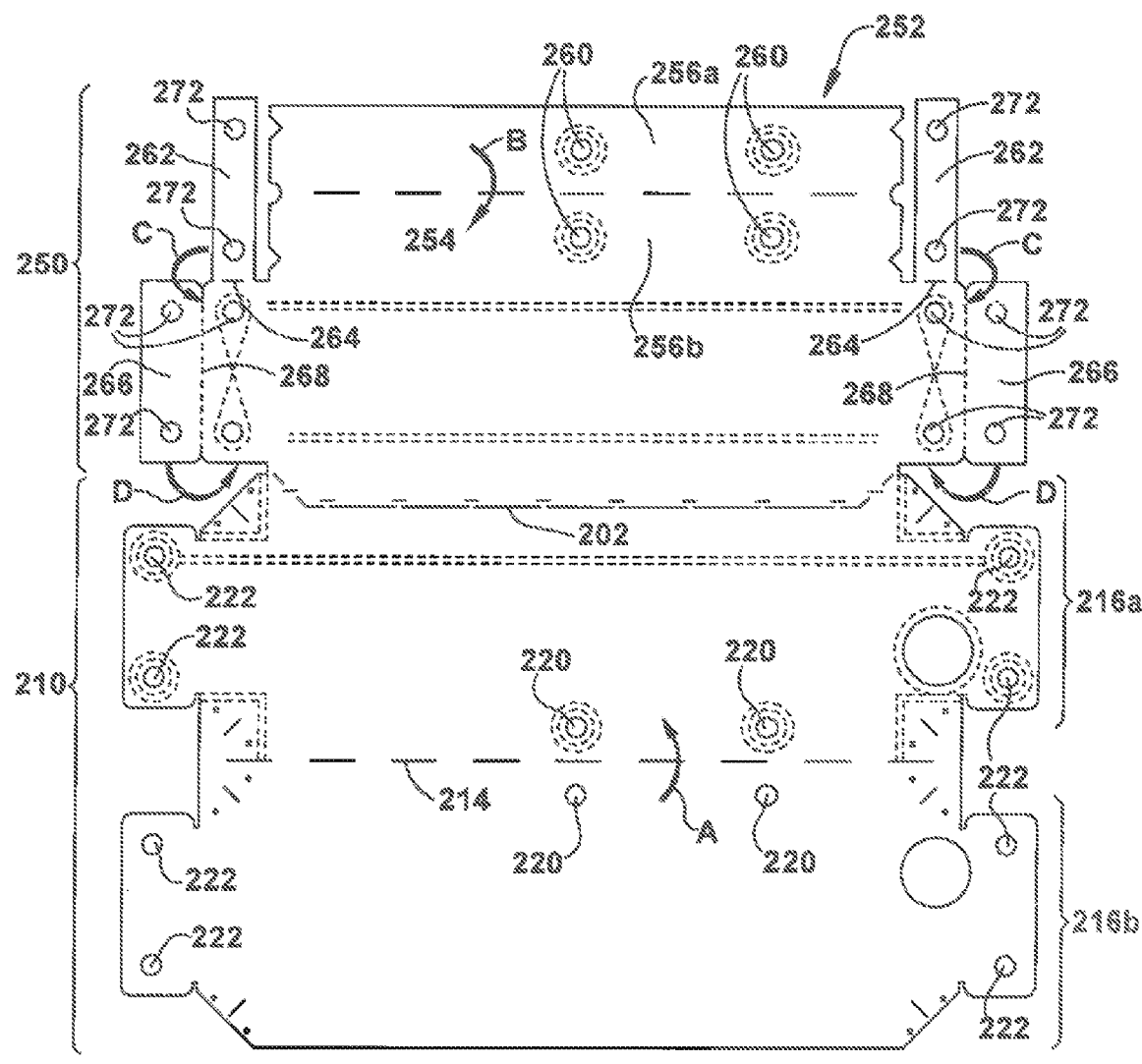
FIG. 14 is a plan view of a portion of the apparatus according to a third example configuration of the apparatus

Referring to FIG. 14, the single fabric panel 200 includes a housing portion 210 and a cover portion 250 that help define a housing 212 and a cover 252, respectively, of an air bag module. A rupturable tear seam 202 extends across the panel 200 in the area where the housing portion 210 and cover portion 250 meet. The long dashed lines in FIG. 14 are fold lines that represent locations on the panel 200 where the housing portion 210 and cover portion 250 are folded to form the housing 212 and cover 252. The short dashed lines in FIG. 14 are stitch lines that represent locations where stitching eventually will be applied as the panel 200 to maintain the shape and configuration of the housing portion 210 and cover portion 250 are folded. As the stitching is added, it will be identified in the appropriate figures by reference number.

Figure 15:
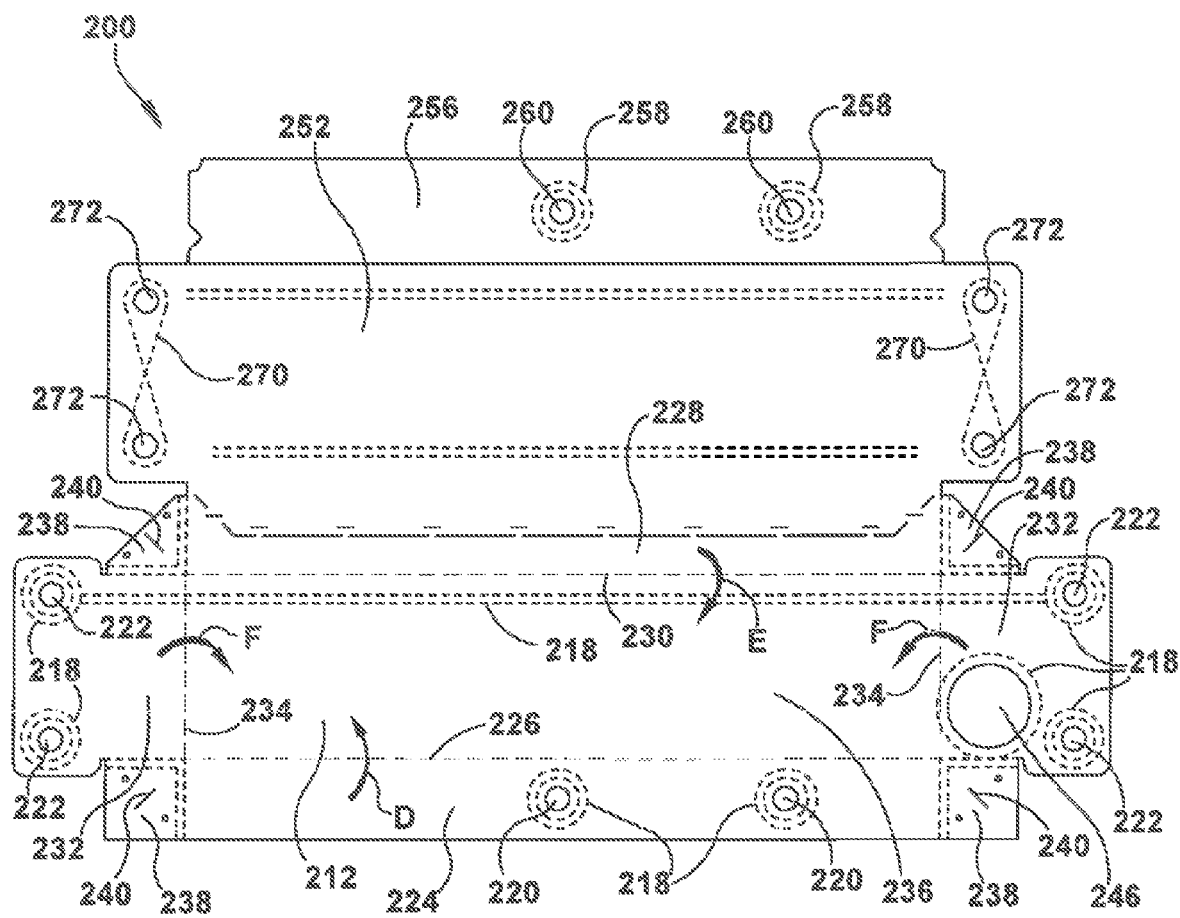
FIGS. 15 and 16 are plan views of the portion of the apparatus of FIG. 14 in different stages of assembly of the apparatus.
Figure 16:
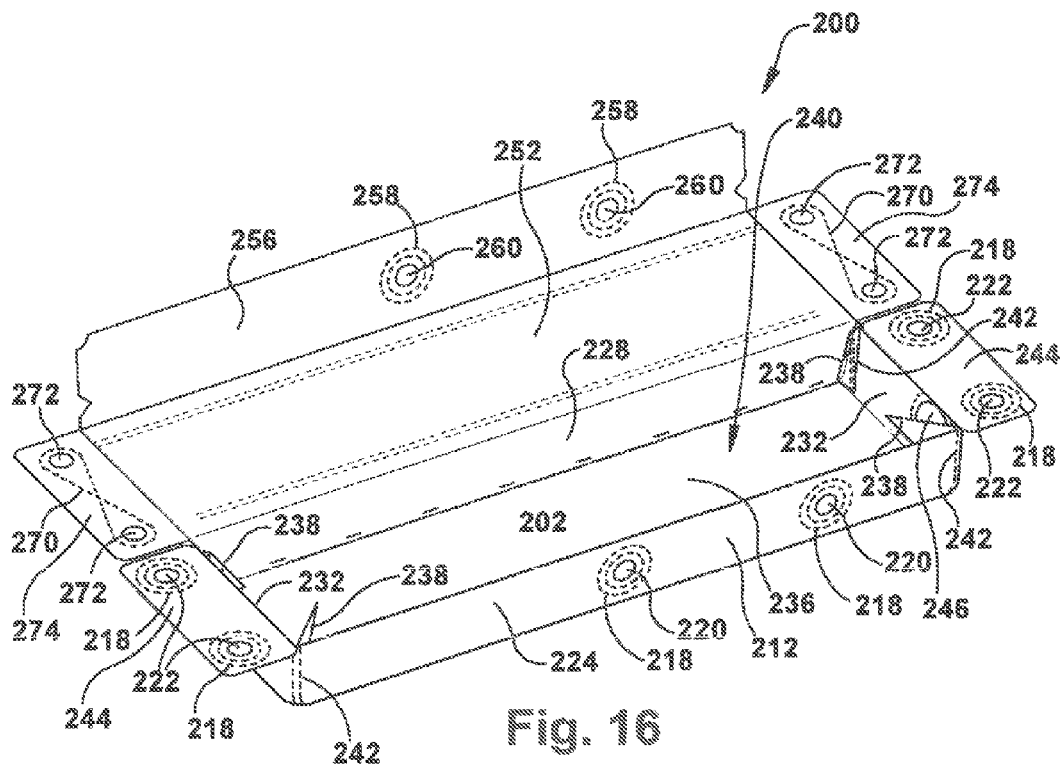

To begin the formation of the housing 212, the housing portion 210 is initially folded over along fold line 214 (see arrow A) so that symmetrical halves 216a, 216b of the housing portion are positioned in an overlying relationship (see FIG. 15), thus doubling the fabric layer thickness of the housing portion. Referring to FIG. 15, once the housing portion 210 is folded, stitch lines 218 are applied to maintain the connection between the overlying portions 216a, 216b.

The stitch lines 218 also encircle and reinforce overlying inflator stud receiving apertures 220 of the housing 212. The stitch lines 218 also encircle and reinforce overlying mounting fastener receiving apertures 222 of the housing 212. The connections surrounding the mounting fastener receiving apertures 222 connect portions of the housing portion 210 that define mounting tabs 244 of the housing 212. Further stitch lines 218 also surround an inflator opening 246 of the housing 212.

To begin the formation of the cover 252, the cover portion 250 is initially folded over along fold line 254 (see arrow B) so that symmetrical portions 256a, 256b of the cover portion are positioned in an overlying relationship (see FIG. 15), thus doubling the fabric layer thickness of a closure flap portion 256 of the cover 252. Referring to FIG. 15, once the portions 256a, 256b are folded, stitch lines 258 are applied to maintain the connection between the overlying portions 256a, 256b. The stitch lines 258 encircle and reinforce overlying inflator stud receiving apertures 260 of the cover 252.

Additionally, to complete the formation of the cover portion 250, tab portions 262 are folded over along fold lines 264 (see arrows C), placing tab portions 262 behind the cover portion 250 as viewed in FIG. 14. Tab portions 266 are folded over along fold lines 268 (see arrows D), placing tab portions 266 behind the cover portion 250 as viewed in FIG. 14. This places tab portions 262 between tab portions 266 and the remainder of the cover portion 250 of the panel 200. Referring to FIG. 15, once the tab portions 262, 266 are folded, stitch lines 270 are applied to maintain the connection of the overlying tab portions 262, 266 to the remainder of the cover portion 250 of the panel 200. The stitch lines 270 encircle and reinforce overlying mounting fastener receiving apertures 272. The portions connected by the stitch lines 270 define multi-layer wings 274 of the cover. This places the panel 200 in the condition of FIG. 15, with the construction of the fabric portion 250 of the cover 252 complete.

Referring to FIG. 15, to complete the construction of the housing 212, a first longitudinal side wall 224 of the housing is folded about fold line 226 as indicated generally by arrow D. A second longitudinal side wall 228 of the housing 212 (containing the tear seam 202) is folded about fold line 230 as indicated generally by arrow E. Opposing lateral side walls 232 of the housing 212 are folded about respective fold lines 234 as indicated generally by the arrows F.

The side walls 224, 228, 232, when folded about their respective fold lines 226, 230, 234, are moved into a rectangular box configuration (see FIG. 16), defining a bottom or base wall 236 of the housing 212. As the side walls 224, 228, 232, are folded into this position, four corner tabs 238 of the housing portion 210 are moved into the interior space 240 (see FIG. 16) of the housing 212. Applying a fold or crease to the corner tabs 238 along respective fold lines 240 positions the stitch lines of the corner tabs (see FIG. 15) overlying each other. Stitching 242 (see FIG. 16) along these stitch lines interconnects the overlying portions of each corner tab 238, which defines the corners of the housing 212 and maintains the rectangular configuration of the side walls 224, 228, 232. The connections realized through the stitching 242 places the housing 212 in the condition of FIG. 16.

Figure 17:
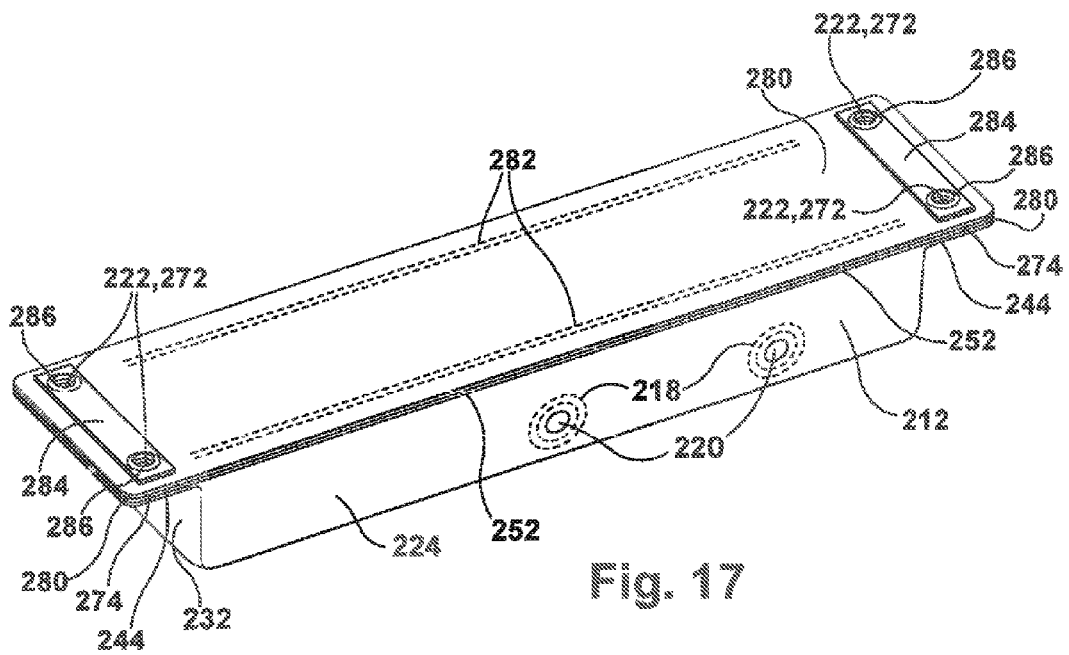
FIG. 17 is a perspective view of the apparatus according to the third example configuration in an assembled condition.

To complete the construction, referring to FIG. 17, a steering panel 280 is secured to the cover 252, for example, by stitching 282. The steering panel 280 can have a configuration and material construction similar or identical to the steering panel described above with regard to the first and/or second example embodiments. As shown in FIG. 17, the steering panel 280 is generally rectangular in shape and has a length sufficient to extend longitudinally beyond the lateral walls 232 of the housing 212. End portions of the steering panel 280 overlie the wings 274 of the cover 252 and have openings that coincide with and overlie the mounting fastener receiving apertures 272. A further reinforcing panel 284 can overlie the apertures 272 and can be fastened to both the steering panel 280 and cover 252 via grommets 286 and/or stitching (not shown). The reinforcing panel 284 can be constructed, for example, of the same material used to construct the steering panel 280. The grommets 286 can be metal grommets that reinforce the overlying apertures that extend through the reinforcing panel 284, steering panel 280, and wings 274 of the cover 252 to connect these components to each other. The grommets 286 can also extend through mounting tabs 244 of the housing 212 to maintain the module in a closed condition (see FIG. 17) for mounting in the vehicle.

To assemble the air bag module using the housing and cover combination of FIGS. 14-17, the inflator is packaged with the air bag and installed in the interior space 240 of the housing 212 with the inflator studs protruding through the inflator stud receiving apertures 220 and the end of the inflator including the electrical connector for the inflator initiator extending through the inflator opening 246. The cover 252 is then placed in the closed position, as shown in FIG. 17. The air bag and inflator can be packaged in an air bag packaging wrap (not shown) that helps to maintain the folded and/or rolled condition of the air bag during the assembly process.

In the closed condition of the housing 212 and cover 252, the end portions of the steering panel 280, the wings 274 of the cover, and the mounting tabs 244 of the housing all overlie each other, placing all of their respective mounting fastener receiving apertures in alignment with each other. The packaged air bag module can then be installed in the vehicle by making the appropriate connections with the inflator studs and mounting fasteners.

Also, in this condition, the inflator studs can also protrude through the apertures 260 in the closure flap portion 256 of the cover 252. Thus, when the inflator is mounted to the vehicle via the inflator mounting studs, the closure flap portion 256 of the cover 252 and the side wall 224 of the housing 212 including the apertures 220 are secured to each other, which further maintains the air bag module in the closed condition.

Figure 11:
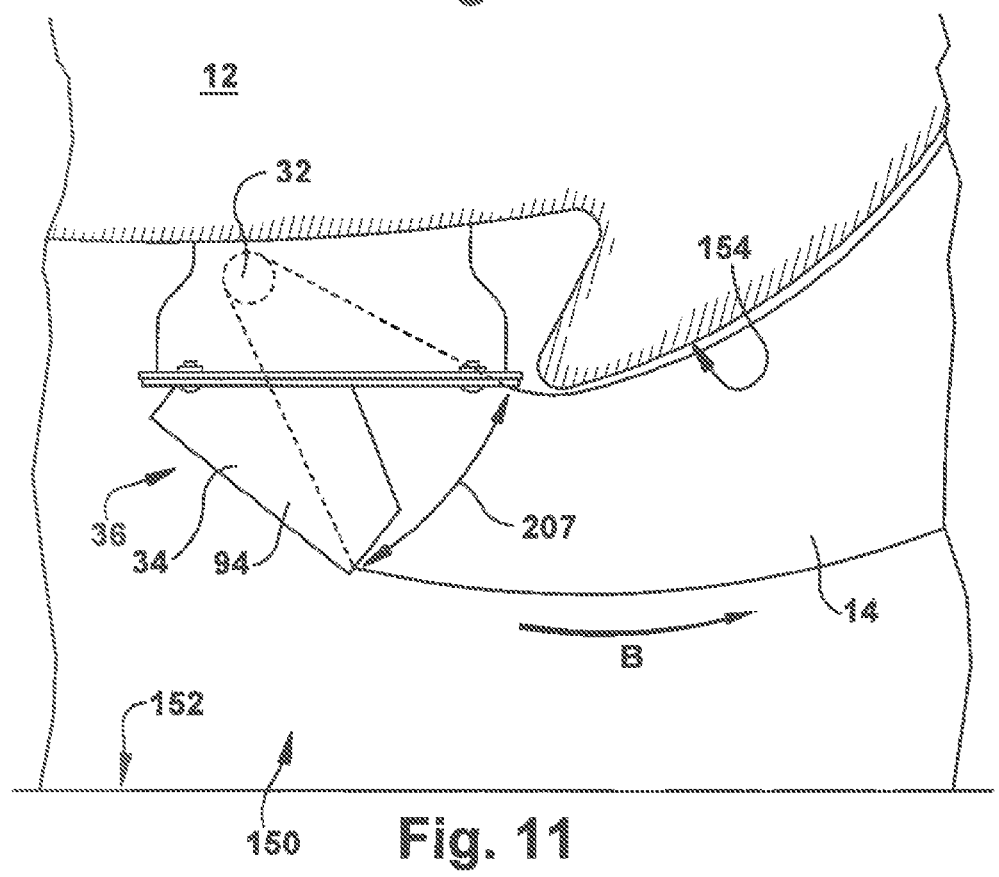
FIG. 11 is a side view illustrating the apparatus installed in a vehicle and in an actuated condition.

Installing the air bag module in the vehicle would position the housing 212 so that the tear seam 202 is positioned in a manner similar or identical to that shown in FIGS. 1, 10, and 11. The housing 212 can thus open and the air bag deployment can proceed in a manner similar or identical to that described with regard to those figures.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

The invention claimed is:

1. An air bag module comprising:
an inflatable air bag;
an inflator for inflating the air bag;
a housing for supporting the air bag and inflator; and
a cover for enclosing the air bag in the housing, the cover comprising:
a fabric panel having a main portion that at least partially envelops the air bag in a deflated and stowed condition, the fabric panel comprising a tear seam that is rupturable upon inflation of the air bag to permit the air to deploy from the housing; and
a steering panel for directing the air bag to deploy from the housing along a predetermined trajectory, the steering panel comprising a panel of reinforcing material that overlies a portion of the fabric panel and is connected to the fabric panel, wherein, in a closed condition of the cover, the steering panel is fastened to the housing.

2. The air bag module of claim 1, wherein overlying portions of both the main panel and the steering panel are fastened to the housing.

3. The air bag module of claim 1, wherein the steering panel forms a cover for covering an open end of the housing.

4. The air bag module of claim 1, wherein the steering panel and the housing together define an enclosure in which the air bag is stored in the deflated and stowed condition prior to deployment.

5. The air bag module of claim 1, wherein the steering panel forms a class-B surface in a vehicle.

6. The air bag module of claim 1, wherein the housing is adapted to be positioned behind a class-A surface of an instrument panel and has an open end from which the air bag deploys, the open end being presented downward into a foot well of a vehicle, the steering panel covering the open end of the housing.

7. The air bag module of claim 1, wherein the air bag is a knee air bag, the air bag and the steering panel being adapted such that the predetermined trajectory is away from a foot well of a vehicle and along a surface of an instrument panel that is presented toward an occupant seat of the vehicle.

8. The air bag module of claim 1, wherein the steering panel deflects the air bag to deploy from the housing while remaining connected to the housing.

9. The air bag module of claim 1, wherein the cover is constructed of nylon and the steering panel is constructed from a high density polyethylene material.

10. The air bag module of claim 1, wherein the fabric panel comprises a main section and two wings sections on opposite lateral ends of the main section, the main section including the tear seam, wherein each of the wings comprises stacked layers of material on a surface of the panel opposite the surface to which the reinforcing panel is connected.

11. The air bag module of claim 10, further comprising apertures for receiving fasteners for mounting the air bag module in the vehicle, the apertures extending through the wings and end portions of the reinforcing panel that overlie the wings.

12. The air bag module of claim 1, wherein the housing comprises a rigid housing separate from the cover.

13. The air bag module of claim 1, wherein the housing comprises a fabric structure formed with the same fabric material used to construct the cover.

14. The air bag module of claim 13, wherein the cover and the housing are formed from a single piece of fabric comprising a cover portion and a housing portion, the cover portion being folded and having portions interconnected to define the cover, the housing portion being folded and having portions interconnected to define the housing.

15. The air bag module of claim 14, wherein the cover portion comprises a main section and two wings on opposite lateral ends of the main section, wherein each of the wings comprises layers of material that are folded over onto a surface of the panel opposite the surface to which the reinforcing panel is connected, the layers of the wings being interconnected with each other.

16. The air bag module of claim 15, further comprising apertures for receiving fasteners for mounting the air bag module in the vehicle, the apertures extending through the wings and end portions of the reinforcing panel that overlie the wings.

17. The air bag module of claim 15, further comprising reinforcing panels secured to opposite ends of the steering panel at locations corresponding to the wings, wherein each reinforcing panel includes apertures that correspond with the apertures in the steering panel and wings that they overlie, and wherein each reinforcing panel is connected to the steering panel and wing by grommets that reinforce the overlying apertures.

18. The air bag module of claim 15, wherein the housing comprises mounting tabs at opposite ends of the housing configured to abut the wings when the cover is in a closed condition, the mounting tabs comprising apertures that correspond in number and position with the apertures of the wings, wherein the housing is maintained in a closed condition through the fastening together of the mounting tabs and wings by fasteners extend through those apertures and mount the air bag module in the vehicle.

19. An air bag module comprising:
a fabric panel comprising a cover portion and a housing portion, the housing portion being folded and having portions interconnected to define a housing for receiving an air bag and inflator, the cover portion being folded and having portions interconnected to define a cover for enclosing an air bag and inflator in the housing, the fabric panel comprising a rupturable tear seam; and a steering panel configured to direct an air bag to deploy from the housing along a predetermined trajectory, the steering panel comprising a panel of reinforcing material that overlies and is connected to the cover, wherein the housing, cover, and steering panel have portions that overlie each other when the cover is in a closed condition, the housing, cover, and steering panel comprising respective apertures that are aligned with each other when the cover is in the closed condition, the apertures being configured to receive fasteners for connecting the housing, cover, and steering panel to the vehicle.

20. The air bag module of claim 19, wherein the cover comprises a main section and two wings on opposite lateral ends of the main section, wherein each of the wings comprises layers of material that are folded over onto a surface of the panel opposite the surface to which the reinforcing panel is connected, the layers of the wings being interconnected with each other.

21. The air bag module of claim 20, wherein the fasteners for connecting the housing, cover, and steering panel to the vehicle extend through the wings and end portions of the reinforcing panel that overlie the wings.

22. The air bag module of claim 20, further comprising reinforcing panels secured to opposite ends of the steering panel at locations corresponding to the wings, wherein each reinforcing panel includes apertures that correspond with the apertures in the steering panel and wings that they overlie, and wherein each reinforcing panel is connected to the steering panel and wing by grommets that reinforce the overlying apertures.

23. The air bag module of claim 20, wherein the housing comprises mounting tabs at opposite ends of the housing configured to abut the wings when the cover is in a closed condition, wherein the fasteners for connecting the housing, cover, and steering panel to the vehicle extend through the mounting tabs.

24. The air bag module of claim 19, wherein the steering panel forms a class-B surface in a vehicle.

25. The air bag module of claim 19, wherein the housing is adapted to be positioned behind a class-A surface of an instrument panel and has an open end from which the air bag deploys, the open end being presented downward into a foot well of a vehicle, the steering panel covering the open end of the housing.

26. The air bag module of claim 19, wherein the air bag is a knee air bag, the air bag and the steering panel being adapted such that the predetermined trajectory is away from a foot well of a vehicle and along a surface of an instrument panel that is presented toward an occupant seat of the vehicle.

27. The air bag module of claim 19, wherein the steering panel deflects the air bag to deploy from the housing while remaining connected to the housing.

28. The air bag module of claim 19, wherein the fabric panel is constructed of nylon and the steering panel is constructed from a high density polyethylene material.

* * * * *